Patented Apr. 27, 1948

2,440,641

UNITED STATES PATENT OFFICE 2,440,641

PROCESS OF OBTAINING BARIUM CARBONATES

Leonard John Minnick, Cheltenham, Pa., assignor to G. and W. H. Corson, Inc., Plymouth Meeting, Pa., a corporation of Delaware No Drawing. Application April 30, 1946, Serial No. 666,186

6 Claims. (Cl. 23—66)

The present invention relates to a novel process for the production of barium carbonate from barium sulphate, and, more particularly, the present invention relates to a process for the treatment of the naturally-occurring barium sulphate by which a relatively high percentage of the sulphate is converted to the carbonate.

Barium-bearing ores include barium sulphate, known as barytes, and at the present time this ore is the most abundant source of barium. It is well known that barium sulphate is exceedingly insoluble and is in a form which renders the separation of the barium values therefrom very difficult. It has heretofore not been feasible to convert barium sulphate into readily usable salts—that is, usable in themselves, or readily convertible into other desired compounds—by means of double decomposition in aqueous medium. Because of the very low solubility of barium sulphate in water, such salt and a soluble carbonate will not react in an aqueous medium to any appreciable extent to convert the barium sulphate into the carbonate. As a matter of fact, as is well-known, barium carbonate is readily converted into the sulphate by sulphate ions. Therefore, conventional methods of recovering barium values in usable form from the sulphate have involved high temperature sintering of the ores to convert the sulphate into the corresponding sulphide and the further conversion of the sulphide to the carbonate. Such a process involves high labor, energy, and equipment costs, and the fused mass is difficult to handle.

One object of the present invention is to provide a simple process of recovering barium values as the carbonate from the sulphate.

Another object of the present invention is to provide a process by which barium sulphate may be converted in an aqueous medium into the carbonate.

Other objects of the invention will be apparent from this specification and the claims.

The barium sulphate treated in accordance with the present invention may be either a synthetically-prepared or naturally-occurring product in finely divided form but due to the fact that the treatment of the ores is more important economically, the invention will be described in connection with the treatment of the native sulphates, and floated ores are particularly applicable for use. Certain of the native sulphate are contaminated by iron compounds to such an extent that the ores are noticeably discolored and at times are of a distinctly red or reddish-brown coloration. When such an ore is to be subjected to treatment in accordance with the present invention, it may be desirable, as an initial step, to remove the iron compounds therefrom by the process described in the copending application of Charles Raymond Brown, Serial No. 666,188 filed April 30, 1946.

In accordance with the process of the present invention, the barium sulphate is reacted in aqueous medium, under conditions hereinafter described, with a soluble carbonate. During the reaction, the reacting mixture is agitated to insure contact between the reactants. In the reaction, the carbonate ion of the soluble carbonate is exchanged for the sulphate ion of the barium sulphate to produce the substantially water-insoluble barium carbonate and a water-soluble sulphate of the cation of the soluble carbonate. Any soluble carbonate may be used in the reaction and the cation may be sodium, potassium, ammonium, or mixtures thereof, or the like. In the preferred embodiment, sodium carbonate is employed because of its availability. A mixture of soluble carbonates may be also employed, in which case a corresponding mixture of soluble sulphate salts will be obtained. The barium carbonate obtained as a result of the reaction will correspond in purity at least to commercially available carbonates of this metal and is useful in itself, or it may be reacted by a suitable procedure to form other desired compounds.

In exchanging the sulphate ion for the carbonate ion, the barium sulphate and the soluble carbonate are mixed in an aqueous medium and the mixture is subjected in an autoclave to a temperature of at least that corresponding to a steam pressure of about 100 pounds per square inch. The temperature employed in any particular case will be dependent upon the equipment available and the temperature in turn will determine the time of reaction and the extent of the conversion of the sulphate into the carbonate. In the preferred embodiment of the invention, a temperature corresponding to a steam pressure between 250 and 500 pounds per square inch is employed, but the upper limit of temperature, so far as the reaction is concerned, is immaterial and will be governed by the equipment. For example, in a high pressure autoclave, the temperature corresponding to a steam pressure of 800 pounds per square inch, or even higher, may be used. Illustrative of the fact that the temperature will determine the time and extent of the reaction, the examples hereinafter set forth show that with a temperature corresponding to a steam pressure of 100 pounds per square inch about 80% of the barium sulphate is convertible into barium carbonate in five hours reaction time, whereas, when a temperature corresponding to a steam pressure of about 350 pounds per square inch is used a conversion of about 90% to 95% of the barium sulphate into barium carbonate is obtainable in about three hours. Additional reaction time at the stated pressures did not increase the conversion to any appreciable extent.

In order to convert the maximum amount of the sulphate into the carbonate, there should be present in the reacting mixture at least 1½ mols of soluble carbonate for each mol of barium sulphate. The amount of carbonate for maximum efficiency of operation will depend to some extent upon the temperature of the reaction and when moderate temperatures are employed, for example, temperatures corresponding to a steam pressure of from about 100 to about 250 pounds per square inch, the amount of carbonate present is preferably at least 2 mols for each mol of the sulphate. Generally, the amount of carbonate used will not exceed about 5 mols for each mol of the sulphate and the preferred range is between 2 and 3 mols of the former to 1 on the latter. A large excess of the soluble carbonate will not interfere with the reaction, but will represent a waste of material.

The quantity of water employed should at least be sufficient to form a saturated solution of the soluble carbonate under the conditions of the reaction. The use of sufficient water, governed by the capacity of the apparatus, to form a free-flowing slurry is recommended but there is no critical upper limit so far as the amount of the water is concerned.

After the completion of the reaction, the contents of the autoclave are transferred to an apparatus, such as a filter, centrifuge, or the like, in which the insoluble barium carbonate together with whatever other solid residue may remain, such as unconverted barium sulphate and traces of silica and alumina, are separated from the dissolved sulphate salts and unreacted soluble carbonate. Since the reaction between the insoluble barium sulphate and the soluble carbonate in aqueous medium is a reversible reaction, the reaction tends to reverse itself by reforming the insoluble barium sulphate, if the reacted contents of the autoclave are allowed to stand for an extended period of time. It is, therefore, desirable to separate the solid barium carbonate from the dissolved sulphate salts as quickly as possible. Since the reversible reaction proceeds slowly, however, it is not necessary to separate the carbonate from the solution immediately. If the reaction mixture is allowed to stand for several hours before the removal of the carbonate, a slight increase in the insoluble sulphate content of the product may be noted.

In the preferred embodiment of the invention, the insoluble carbonate is removed from the solution while the reaction mixture is still hot. This may be accomplished by releasing the pressure from the autoclave and separating the solution from the solids at a temperature approaching the boiling point of the solution at atmospheric pressure or by filtering the contents of the autoclave under elevated pressure, for example such as employed in the reaction.

The solid residue thus obtained is of a purity comparable to that of commercial barium sulphate products and contains in addition to the barium carbonate, a small amount of unreacted barium sulphate and traces of silica and alumina, and may be washed with water to remove any adhering soluble salts. Generally, the carbonate content of this residue will range from between about 80% to about 95% depending on the pressure employed as previously mentioned. When it is desired to obtain a purer product, the solids may be re-suspended in water and transferred to any suitable mechanical means for separating solids of different gravtities, such as a centrifuge, wherein it is possible to separate the major portion of the heavier unreacted barium sulphate and other impurities from the insoluble carbonate salt. This separation is possible because the carbonate formed as the result of the reaction is in a lighter and more readily suspendable form than the unreacted material. The purity of the resulting product may reach as high as 98%-99% when a product, in which the insoluble sulphate has been converted to the carbonate to the extent of 90%-95%, is treated. When, however, a product is treated in which the conversion of the insoluble sulphate is substantially lower, then the purity of the product obtained after the treatment to separate the different solids from each other is less. Not only is it less because the amount of impurity to be removed is greater but also because the efficiency of the separation process decreases as the product treated increases in unconverted sulphate content. For example, when a product in which there has been an 80% conversion of the sulphate to the carbonate is treated, a product of a purity in the neighborhood of 88% to 90% may be obtained.

Instead of removing the solids by a filter or centrifuge and thereafter re-suspending the solids in water and separating the solids of the two types as described above, the product from the autoclave can be treated directly to separate the two types of solids and the adhering solution of soluble salts may be removed by washing with water either subsequently to or simultaneously with this separation step.

While the foregoing description is directed to a batch process, it is to be understood that the reaction may be carried out in a series of steps in which the filtrate from a subsequent step is used to treat the sulphate in a previous step. In fact, if desired, this can be carried out in a continuous manner. This is typical of many countercurrent processes. While this type of procedure does not increase the conversion of the sulphate to any marked extent, it may be advantageous to employ it when it is desired to make economical use of the soluble carbonate.

The soluble constituents comprising soluble sulphate, unreacted soluble carbonate, and traces of dissolved impurities may be treated so that they may be recovered and reused as the soluble carbonate in the autoclave reaction. For example, the filtrate may be digested with calcium hydroxide to convert the dissolved carbonate and sulphate into the corresponding hydroxide. After filtration to obtain a clear hydroxide solution, carbon dioxide may be passed therethrough to convert the hydroxide into the corresponding soluble carbonate.

The barium carbonate obtained by this process may be useful in itself for many purposes or may be used as a starting material to form other useful barium compounds. For example, the carbonate may be dissolved in a suitable acid to obtain the corresponding salt.

As an example, but in no way intended to limit the invention, 100 pounds of barytes, 100 pounds of sodium carbonate, and 250 pounds of water are introduced into an autoclave and processed for three hours at a temperature corresponding to a steam pressure of 350 pounds per square inch. The end products obtained are:

| | Pounds |
|---|---|
| Sodium sulphate | 56 |
| Sodium carbonate | 58 |
| Barium carbonate | 78 |
| Residue | 8 |
| Water | 250 |

From the foregoing, it will be seen that the conversion of the barium sulphate to barium carbonate is approximately 92%.

In another example, the reactants in the stated amounts are reacted at a temperature corresponding to a steam pressure of 100 pounds per square inch for five hours. The end products obtained are:

| | Pounds |
|---|---|
| Sodium sulphate | 50 |
| Sodium carbonate | 63 |
| Barium carbonate | 69 |
| Residue | 18 |
| Water | 250 |

In this example, the conversion of barium sulphate to barium carbonate is approximately 82%.

From the foregoing description, it will be noted that, contrary to the accepted belief that a suspension of barium carbonate cannot be obtained in a practical amount by treating the aqueous suspension of the insoluble sulphate with a soluble carbonate, a process has been devised where such a reaction is possible, since, with temperatures exceeding those corresponding to a steam pressure of 100 pounds per square inch, an 80% or greater conversion of the sulphate into the carbonate is possible.

Considerable modification is possible in the process described herein without departing from the essential features of the invention.

I claim:

1. The process of producing barium carbonate which comprises reacting barium sulphate and a soluble carbonate in an aqueous medium at a temperature of at least that corresponding to a steam pressure of about 100 pounds per square inch, the soluble carbonate being present in an amount in excess of about 1½ mols per mol of sulphate; and separating the solids from the solution.

2. The process of claim 1 wherein the reaction is continued at said temperature with a conversion of at least about 80% of the barium sulphate into barium carbonate has been obtained; and wherein the solids are separated from the solution before appreciable reconversion of the barium carbonate into barium sulphate has taken place.

3. The process of producing barium carbonate from barium sulphate which comprises reacting said sulphate and a soluble carbonate in an aqueous medium at a temperature corresponding to a steam pressure of between about 250 and about 500 pounds per square inch until the reaction is substantially completed, the soluble carbonate being present in an amount between about 2 to about 3 mols per mol of sulphate, and separating the solids from the solution before appreciable reconversion of the barium carbonate into barium sulphate has taken place.

4. The process of claim 3 wherein the soluble carbonate is sodium carbonate and wherein the solids are separated from the solution while the reaction mass is still hot.

5. The process of producing barium carbonate from barium sulphate which comprises reacting said sulphate and a soluble carbonate in an aqueous medium at a temperature of at least that corresponding to a steam pressure of about 100 pounds per square inch until the reaction is substantially completed, the soluble carbonate being present in an excess of about 1½ mols per mol of sulphate; and separating the solids from the solution before appreciable reconversion of the insoluble carbonate formed into the insoluble sulphate has taken place and separating the major portion of the unreacted sulphate from the carbonate.

6. The process of claim 5 wherein the soluble carbonate is sodium carbonate; wherein the solids are separated from the solution while the reaction mass is still hot; and wherein the major portion of the unreacted sulphate is separated from the carbonate in a step subsequent to removal of the solution from the reaction mass.

LEONARD JOHN MINNICK.